US012333795B2

(12) United States Patent
Chen et al.

(10) Patent No.: US 12,333,795 B2
(45) Date of Patent: Jun. 17, 2025

(54) MULTIMODAL DATA PROCESSING

(71) Applicant: BEIJING BAIDU NETCOM SCIENCE TECHNOLOGY CO., LTD., Beijing (CN)

(72) Inventors: Shuai Chen, Beijing (CN); Qi Wang, Beijing (CN); Hu Yang, Beijing (CN); Feng He, Beijing (CN); Zhifan Feng, Beijing (CN); Chunguang Chai, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 440 days.

(21) Appl. No.: 17/945,415

(22) Filed: Sep. 15, 2022

(65) Prior Publication Data

US 2023/0010160 A1    Jan. 12, 2023

(30) Foreign Application Priority Data

Sep. 17, 2021 (CN) .......................... 202111095097.5

(51) Int. Cl.
*G06V 10/82* (2022.01)
*G06N 3/08* (2023.01)
*G06V 10/80* (2022.01)

(52) U.S. Cl.
CPC ............... *G06V 10/82* (2022.01); *G06N 3/08* (2013.01); *G06V 10/80* (2022.01)

(58) Field of Classification Search
CPC .......... G06V 10/82; G06V 10/80; G06N 3/08; G06N 3/0455; G06N 3/09; G06N 3/045; G06F 18/253; G06F 18/214
See application file for complete search history.

(56) References Cited

U.S. PATENT DOCUMENTS

2021/0019531 A1   1/2021   Long et al.
2021/0027165 A1   1/2021   Tu et al.
(Continued)

FOREIGN PATENT DOCUMENTS

CN    110399841 A    11/2019
CN    111680541 A    9/2020
CN    113240056 A    8/2021

OTHER PUBLICATIONS

Siriwardhana et al. Multimodal emotion recognition with transformer-based self-supervised feature fusion. Ieee Access. Sep. 25, 2020;8:176274-85 (Year: 2020).*

(Continued)

*Primary Examiner* — Fayyaz Alam
(74) *Attorney, Agent, or Firm* — Leydig, Voit & Mayer, Ltd.

(57) ABSTRACT

Disclosed are a method for processing multimodal data using a neural network, a device, and a medium, and relates to the field of artificial intelligence and, in particular to multimodal data processing, video classification, and deep learning. The neural network includes: an input subnetwork configured to receive the multimodal data to output respective first features of a plurality of modalities; a plurality of cross-modal feature subnetworks, each of which is configured to receive respective first features of two corresponding modalities to output a cross-modal feature corresponding to the two modalities; a plurality of cross-modal fusion subnetworks, each of which is configured to receive at least one cross-modal feature corresponding to a corresponding target modality and other modalities to output a second feature of the target modality; and an output subnetwork configured to receive respective second features of the plurality of modalities to output a processing result of the multimodal data.

18 Claims, 7 Drawing Sheets

(56) References Cited

U.S. PATENT DOCUMENTS

2021/0151034 A1    5/2021  Hasan et al.
2022/0044022 A1*   2/2022  Gan .................... G06V 20/46

OTHER PUBLICATIONS

Jin Q, Chen J, Chen S, Xiong Y, Hauptmann A. Describing videos using multi-modal fusion. InProceedings of the 24th ACM international conference on Multimedia Oct. 1, 2016 (pp. 1087-1091). (Year: 2016).*

Hori C, Hori T, Lee TY, Zhang Z, Harsham B, Hershey JR, Marks TK, Sumi K. Attention-based multimodal fusion for video description. InProceedings of the IEEE international conference on computer vision 2017 (pp. 4193-4202). (Year: 2017).*

Williams J, Kleinegesse S, Comanescu R, Radu O. Recognizing emotions in video using multimodal DNN feature fusion. InProceedings of Grand Challenge and Workshop on Human Multimodal Language (Challenge-HML) Jul. 2018 (pp. 11-19). (Year: 2018).*

Siriwardhana et al., "Multimodal Emotion Recognition With Transformer-Based Self Supervised Feature Fusion," IEEE Access, vol. 8, pp. 176274-176285 (Sep. 25, 2020).

Huan et al., "Video multimodal emotion recognition based on Bi-GRU and attention fusion," Springer, Multimedia Tools and Applications, pp. 8213-8240 (Oct. 31, 2020).

* cited by examiner

MULTIMODAL DATA PROCESSING

CROSS REFERENCE TO RELATED APPLICATIONS

This application claims priority to Chinese Patent Application No. 202111095097.5, filed on Sep. 17, 2021, the contents of which are hereby incorporated by reference in their entirety for all purposes.

TECHNICAL FIELD

The present disclosure relates to the field of artificial intelligence, in particular to multimodal data processing, video classification technologies, and deep learning technologies, and specifically to a neural network for multimodal data, a method for processing multimodal data by using a neural network, a training method for a neural network, an electronic device, a computer-readable storage medium, and a computer program product.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, and machine learning/deep learning, big data processing technologies, and knowledge graph technologies.

In recent years, as software and hardware technologies rapidly develop, multimodal data has gradually become one of the major forms of information transfer. Processing of multimodal data is required in scenarios of multimodal data distribution, multimodal data compression, multimodal data classification, and the like.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a neural network for multimodal data, a method for processing multimodal data by using a neural network, a training method for a neural network, an electronic device, a computer-readable storage medium, and a computer program product.

According to an aspect of the present disclosure, there is provided a neural network for multimodal data, the network including: an input subnetwork configured to receive multimodal data to output respective first features of a plurality of modalities included in the multimodal data; a plurality of cross-modal feature subnetworks, each cross-modal feature subnetwork of the plurality of cross-modal feature subnetworks corresponds to two modalities of the plurality of modalities and is configured to receive the respective first features of the two modalities to output a cross-modal feature corresponding to the two modalities; a plurality of cross-modal fusion subnetworks in a one-to-one correspondence with the plurality of modalities, where each cross-modal fusion subnetwork of the plurality of cross-modal fusion subnetworks is configured to: for a modality corresponding to the cross-modal fusion subnetwork, receive at least one cross-modal feature corresponding to the modality to output a second feature of the modality; and an output subnetwork configured to receive the respective second features of the plurality of modalities to output a processing result of the multimodal data.

According to another aspect of the present disclosure, there is provided a method for processing multimodal data by using a neural network, where the neural network includes an input subnetwork, a plurality of parallel cross-modal feature subnetworks, a plurality of parallel cross-modal fusion subnetworks, and an output subnetwork, where the plurality of parallel cross-modal feature subnetworks, the plurality of parallel cross-modal fusion subnetworks, and the output subnetwork are sequentially connected, where each cross-modal feature subnetwork of the plurality of parallel cross-modal feature subnetworks corresponds to two modalities in a plurality of modalities included in the multimodal data, and the plurality of cross-modal fusion subnetworks are in a one-to-one correspondence with the plurality of modalities. The method includes: inputting the multimodal data to the input subnetwork, to obtain respective first features of the plurality of modalities that are output by the input subnetwork; inputting the respective first features of every two modalities of the plurality of modalities to a corresponding cross-modal feature subnetwork of the plurality of parallel cross-modal feature subnetworks, to obtain a cross-modal feature to the corresponding two modalities that is output by each cross-modal feature subnetwork of the plurality of parallel cross-modal feature subnetworks; for each modality of the plurality of modalities, inputting at least one cross-modal feature corresponding to the modality to a cross-modal fusion subnetwork of the plurality of parallel cross-modal fusion subnetworks corresponding to the modality, to obtain a second feature of a corresponding modality that is output by each cross-modal fusion subnetworks of the plurality of parallel cross-modal fusion subnetworks; and inputting respective second features of the plurality of modalities to the output subnetwork, to obtain a processing result of the multimodal data that is output by the output subnetwork.

According to another aspect of the present disclosure, there is provided a training method for a neural network, the neural network including an input subnetwork, a plurality of parallel cross-modal feature subnetworks, a plurality of parallel cross-modal fusion subnetworks, and an output subnetwork that are sequentially connected, where each of the plurality of cross-modal feature subnetworks corresponds to two modalities in a plurality of modalities comprised in the multimodal data, and the plurality of cross-modal fusion subnetworks are in a one-to-one correspondence with the plurality of modalities. The method includes: obtaining sample multimodal data and a true label of the sample multimodal data; inputting the sample multimodal data to the input subnetwork, to obtain respective first features of the plurality of modalities that are output by the input subnetwork; inputting the respective first features of every two of the plurality of modalities to a corresponding cross-modal feature subnetwork, to obtain a cross-modal feature corresponding to the corresponding two modalities that is output by each of the plurality of cross-modal feature subnetworks; for each of the plurality of modalities, inputting at least one cross-modal feature corresponding to the modality to a cross-modal fusion subnetwork corresponding to the modality, to obtain a second feature of a corresponding modality that is output by each of the plurality of cross-modal fusion subnetworks; and inputting respective second features of the plurality of modalities to the output subnetwork, to obtain a predicted label of the sample multimodal data that is output by the output subnetwork; calculating a loss value based on the predicted label and the true label; and adjusting a parameter of the neural network based on the loss value.

According to another aspect of the present disclosure, there is provided an electronic device, including: one or more processors; a memory storing one or more programs configured to be executed by the one or more processors, the one or more programs including instructions for: inputting the multimodal data to an input subnetwork of a neural network, to obtain respective first features of the plurality of modalities that are output by the input subnetwork, where the neural network further comprises a plurality of parallel cross-modal feature subnetworks, a plurality of parallel cross-modal fusion subnetworks, and an output subnetwork that are sequentially connected, where each of the plurality of cross-modal feature subnetworks corresponds to two modalities in a plurality of modalities comprised in the multimodal data, and the plurality of cross-modal fusion subnetworks are in a one-to-one correspondence with the plurality of modalities; inputting the respective first features of every two of the plurality of modalities to a corresponding cross-modal feature subnetwork, to obtain a cross-modal feature corresponding to the corresponding two modalities that is output by each of the plurality of cross-modal feature subnetworks; for each of the plurality of modalities, inputting at least one cross-modal feature corresponding to the modality to a cross-modal fusion subnetwork corresponding to the modality, to obtain a second feature of a corresponding modality that is output by each of the plurality of cross-modal fusion subnetworks; and inputting respective second features of the plurality of modalities to the output subnetwork, to obtain a processing result of the multimodal data that is output by the output subnetwork.

According to another aspect of the present disclosure, there is provided a non-transitory computer-readable storage medium storing one or more programs, the one or more programs comprising instructions, which when executed by one or more processors of an electronic device, cause the electronic device to: input the multimodal data to an input subnetwork of a neural network, to obtain respective first features of the plurality of modalities that are output by the input subnetwork, where the neural network further comprises a plurality of parallel cross-modal feature subnetworks, a plurality of parallel cross-modal fusion subnetworks, and an output subnetwork that are sequentially connected, where each of the plurality of cross-modal feature subnetworks corresponds to two modalities in a plurality of modalities comprised in the multimodal data, and the plurality of cross-modal fusion subnetworks are in a one-to-one correspondence with the plurality of modalities; input the respective first features of every two of the plurality of modalities to a corresponding cross-modal feature subnetwork, to obtain a cross-modal feature corresponding to the corresponding two modalities that is output by each of the plurality of cross-modal feature subnetworks; for each of the plurality of modalities, input at least one cross-modal feature corresponding to the modality to a cross-modal fusion subnetwork corresponding to the modality, to obtain a second feature of a corresponding modality that is output by each of the plurality of cross-modal fusion subnetworks; and input respective second features of the plurality of modalities to the output subnetwork, to obtain a processing result of the multimodal data that is output by the output subnetwork.

According to another aspect of the present disclosure, there is provided a computer program product, including a computer program, where when the computer program is executed by a processor, the method described above is implemented.

According to one or more embodiments of the present disclosure, cross-modal features between different modalities are calculated, for each modality, a global feature of the modality is obtained based on all cross-modal features corresponding to the modality, and then multimodal data is analyzed based on the global feature of the modality, so that the modality features are deeply fused, and interaction between the modality features is enhanced, effectively helping a neural network deeply understand the multimodal data and improving reliability and accuracy of a processing result of the multimodal data.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The drawings exemplarily show embodiments and form a part of the specification, and are used to explain exemplary implementations of the embodiments together with a written description of the specification. The embodiments shown are merely for illustrative purposes and do not limit the scope of the claims. Throughout the drawings, identical reference signs denote similar but not necessarily identical elements.

DETAILED DESCRIPTION

Example embodiments of the present disclosure are described below in conjunction with the accompanying drawings, where various details of the embodiments of the present disclosure are included to facilitate understanding, and should only be considered as examples. Therefore, those of ordinary skill in the art should be aware that various changes and modifications can be made to the embodiments described herein, without departing from the scope of the present disclosure. Likewise, for clarity and conciseness, description of well-known functions and structures are omitted in the following descriptions.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

In the related art, because of a large data amount of multimodal data, different amounts of information included by data of different modalities, and different degrees of understanding difficulty, an existing multimodal data processing method usually only uses a small part of the information, and such a method is prone to cause one-sided understanding of the multimodal data. In addition, the existing multimodal data processing method has limited interaction between different modalities and does not fully utilize multimodality of data.

To solve the foregoing problem, in the present disclosure, cross-modal features between different modalities are calculated, for each modality, a global feature of the modality is obtained based on all cross-modal features corresponding to the modality, and then multimodal data is analyzed based on the global feature of the modality, so that the modality features are deeply fused, and interaction between the modality features is enhanced, effectively helping a neural network deeply understand the multimodal data and improving reliability and accuracy of a processing result of the multimodal data.

Embodiments of the present disclosure will be described below in detail in conjunction with the drawings.

Figure 1:
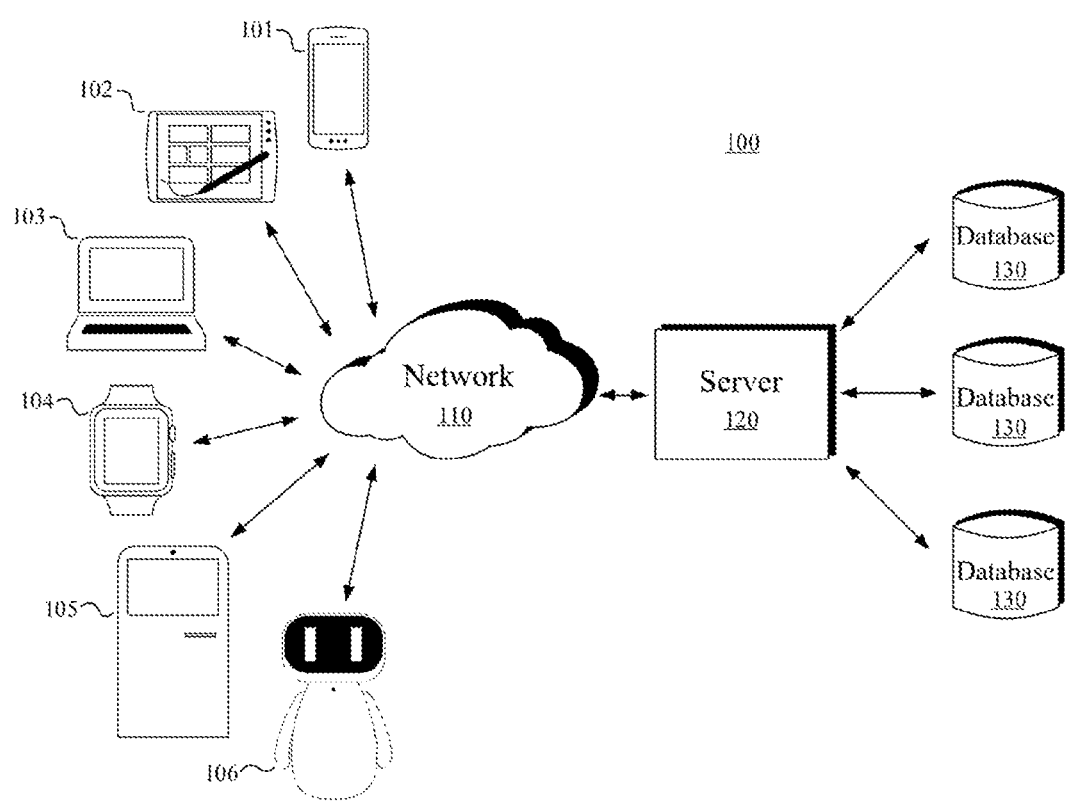
FIG. 1 is a schematic diagram of an exemplary system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more application programs.

In an embodiment of the present disclosure, the server 120 may run one or more services or software applications that enable a method for processing multimodal data by using a neural network to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) network.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may use the client device 101, 102, 103, 104, 105, and/or 106 to perform information verification. The client device may provide an interface that enables the user of the client device to interact with the client device. For example, the user may use a client to collect multimodal data through various input devices, or may use the client to process the multimodal data. The client device may also output information to the user via the interface. For example, the client may output a data processing result to the user. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software application programs and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and a video file. The database 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be a database, such as a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
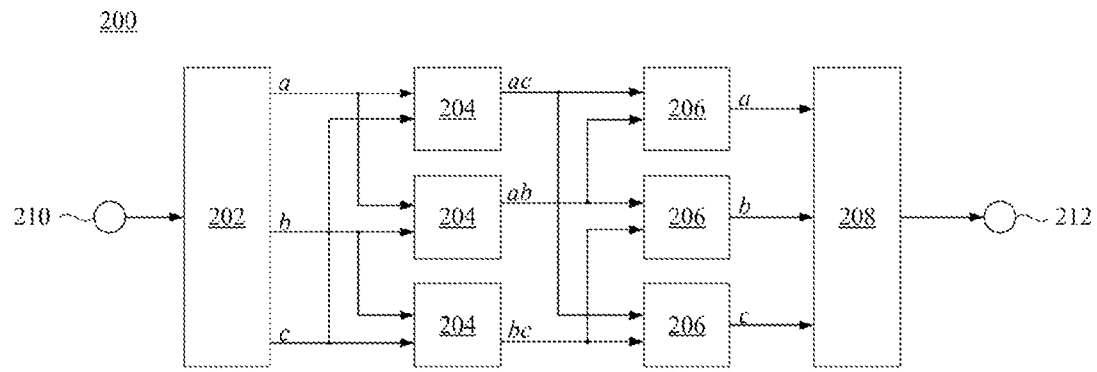
FIG. 2 is a structural block diagram of a neural network for multimodal data according to an exemplary embodiment of the present disclosure.

According to an aspect of the present disclosure, there is provided a neural network for multimodal data. As shown in FIG. 2, the neural network 200 includes: an input subnetwork 202 configured to receive multimodal data 210 to output respective first features of a plurality of modalities a, b, and c included in the multimodal data; a plurality of cross-modal feature subnetworks 204, each of which corresponds to two of the plurality of modalities and is configured to receive the respective first features of the two modalities to output a cross-modal feature corresponding to the two modalities; a plurality of cross-modal fusion subnetworks 206 in a one-to-one correspondence with the plurality of modalities, where each of the plurality of cross-modal fusion subnetworks 206 is configured to: for a target modality corresponding to the cross-modal fusion subnetwork 206, receive at least one cross-modal feature corresponding to the target modality to output a second feature of the target modality; and an output subnetwork 208 configured to receive respective second features of the plurality of modalities to output a processing result 212 of the multimodal data.

In this way, cross-modal features between different modalities are calculated, for each modality, a global feature of the modality is obtained based on all cross-modal features corresponding to the modality, and then multimodal data is analyzed based on the global feature of the modality, so that the modality features are deeply fused, and interaction between the modality features is enhanced, effectively helping a neural network deeply understand the multimodal data and improving reliability and accuracy of a processing result of the multimodal data.

According to some embodiments, as shown in FIG. 2, the input subnetwork, the plurality of parallel cross-modal feature subnetworks, the plurality of parallel cross-modal fusion subnetworks, and the output subnetwork may be sequentially connected, so that output from a previous subnetwork can serve as input to a current subnetwork.

According to some embodiments, the multimodal data may be a set including data of different modalities, for example, video data of modalities such as image, audio, and text, or commodity data of modalities such as commodity ID, commodity image, and commodity promotional text, or medical data of modalities such as physiological index value, medical image, and case text, or data of other different modalities. This is not limited herein. In an example embodiment, the multimodal data may be video data.

In the present disclosure, the video data and three modalities, namely, image, text, and audio, are mainly described as an example and are not intended to limit the protection scope of the present disclosure. It can be understood that the neural network and the method described in the present disclosure can be applied by those skilled in the art to any multimodal data. This is not limited herein.

According to some embodiments, the input subnetwork can split raw multimodal data, that is, video data including a text, into corresponding image data, text data, and audio data. In some embodiments, the image data may be, for example, an image sequence including all video frames. The text data may be, for example, a text for describing a video, or may be a caption text in the video, or may be another text related to the video. The audio data may be an audio part in the video. It can be understood that for different types of multimodal data, a corresponding data splitting method can be used to obtain data corresponding to each modality.

According to some embodiments, before data of each modality is input to the input subnetwork, the data of the modality can also be preprocessed, to reduce difficulty of subsequence data processing and improve accuracy of a processing result of the data.

Figure 3:
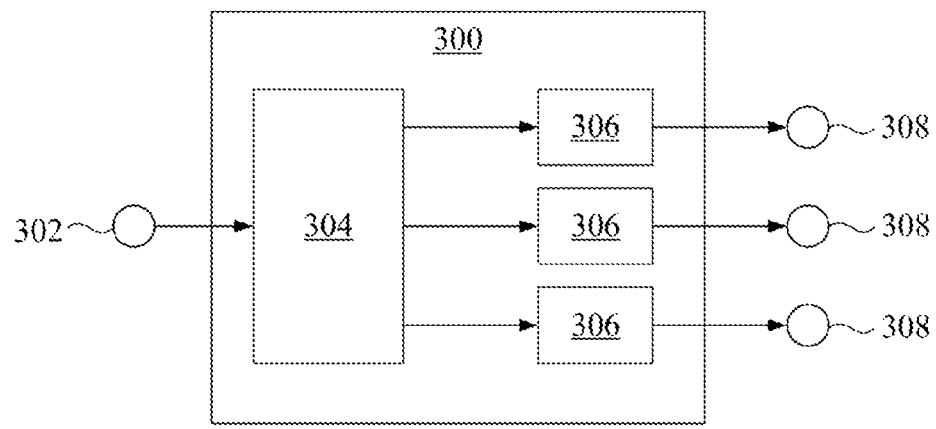
FIG. 3 is a structural block diagram of an input subnetwork according to an exemplary embodiment of the present disclosure.

According to some embodiments, as shown in FIG. 3, the input subnetwork 300 may include: a multimodal splitting subnetwork 304 configured to split multimodal data 302 into respective data of a plurality of modalities; a plurality of feature extraction subnetworks 306 in a one-to-one correspondence with the plurality of modalities, where each of the plurality of feature extraction subnetworks 306 is configured to: determine an initial feature sequence of a modality in the multimodal data 302 corresponding to the feature extraction subnetwork 306 based on data of the modality, where each item in the initial feature sequence corresponds to one part of the data of the modality; and determine a first feature 308 of the modality at least based on the initial feature sequence. In this way, the feature sequence is extracted from the modality data and then the first feature of the modality is determined based on the feature sequence, so that the feature of the modality can be comprehensively represented.

According to some embodiments, the determining an initial feature sequence of a modality in the multimodal data corresponding to the feature extraction subnetwork based on data of the modality may include, for example: splitting and sampling the data to obtain several parts of data corresponding to data of each modality, and then performing feature extraction on the several parts of data to obtain a corresponding initial feature sequence. In an example embodiment, for image data, key frames are extracted from the image data according to a preset rule, and these key frames are encoded by using an image expert model such as ResNet and Xception to obtain an image feature sequence; for text data, words of each text are encoded by using a text expert model such as ERNIE and BERT to obtain a text feature sequence; and for audio data, the data can be split according to preset duration and converted into frequency-domain signals through Fourier transformation, and then a frequency-domain signal of each segment of audio is encoded by using an audio expert model such as VGGish to obtain an audio feature sequence. In an example embodiment, an initial feature sequence of an image modality may be represented as $F=[F_1^v, \ldots, F_l^v]$, where $F_i^v$ indicates an $i^{th}$ item in the sequence corresponding to the image modality, and the sequence has l items in total.

According to some embodiments, lengths of feature sequences output by expert models of different modalities may be the same or different, and feature dimensions of feature sequences output by expert models of different modalities may be the same or different. This is not limited herein. In an example embodiment, feature dimensions of feature sequences output by expert models of different modalities are the same.

According to some embodiments, each modality may correspond to one first feature as a representation of data of the modality. In some example embodiments, a first feature of the image modality may be, for example, obtained after the image sequence is input to a neural network for extracting an image feature, or may be obtained by using a conventional method for extracting an image feature, or may be obtained by using another method. It can be understood that for first features of different modalities, those skilled in the art may select a suitable feature extraction method by themselves according to needs to obtain corresponding first features. This is not limited herein. According to some embodiments, dimensions of first features of different modalities may be the same or different. This is not limited herein. In an example embodiment, dimensions of first features of different modalities are the same.

According to some embodiments, the determining a first feature of the modality at least based on the initial feature sequence may include: determining a first feature component based on the initial feature sequence; determining a second feature component, where the second feature component is capable of indicating a type of the modality; and determining the first feature of the modality based on the first feature component and the second feature component. In this way, first features of different modalities can be distinguished in a feature space by using a feature component for indicating a type of a modality, thereby improving processing accuracy of the neural network for the multimodal data.

In an example embodiment, a first feature component of the image modality may be represented as $F_{agg}^v$, and a second feature component may be represented as $M_{agg}^v$.

According to some embodiments, the first feature component may be determined by performing max-pooling on the initial feature sequence. In this way, through max-pooling on the initial feature sequence, the initial feature sequence is comprehensively represented by the obtained first feature component, thereby improving processing accuracy of the neural network for the multimodal data. It can be understood that those skilled in the art may alternatively obtain the first feature component based on the initial feature sequence by using other methods such as average pooling, random sampling, median value calculation, weighted summation, and other operations. This is not limited herein.

According to some embodiments, the determining a first feature of the modality at least based on the initial feature sequence may further include: determining a third feature component, where the third feature component is capable of indicating position information in the initial feature sequence. In an example embodiment, the third feature component can be obtained through position coding. In an example embodiment, a sequence of the third feature component that is corresponding to the initial feature sequence of the image modality may be represented as $P=[P_1^v, \ldots, P_l^v]$, where items in the sequence are all different. $P_{agg}^v$ different from all the items in the sequence P may be determined as the third feature component.

According to some embodiments, the first feature of the modality may be determined by adding the first feature component, the second feature component, and the third feature component. In an example embodiment, the first feature corresponding to the image modality may be represented as $H_{agg}^v = F_{agg}^v + M_{agg}^v + P_{agg}^v$.

According to some embodiments, after the first feature of each modality is obtained, the first feature may be mapped to a query feature Q, a key feature K, and a value feature V for outputting. In some embodiments, for different modalities, a group of different parameter matrices $W_Q$, $W_K$, and $W_V$ may be used to map the first feature. In this way, a deeply-fused cross-modal feature can be subsequently generated by mapping the first feature to the three features Q, K, and V.

Figure 4:
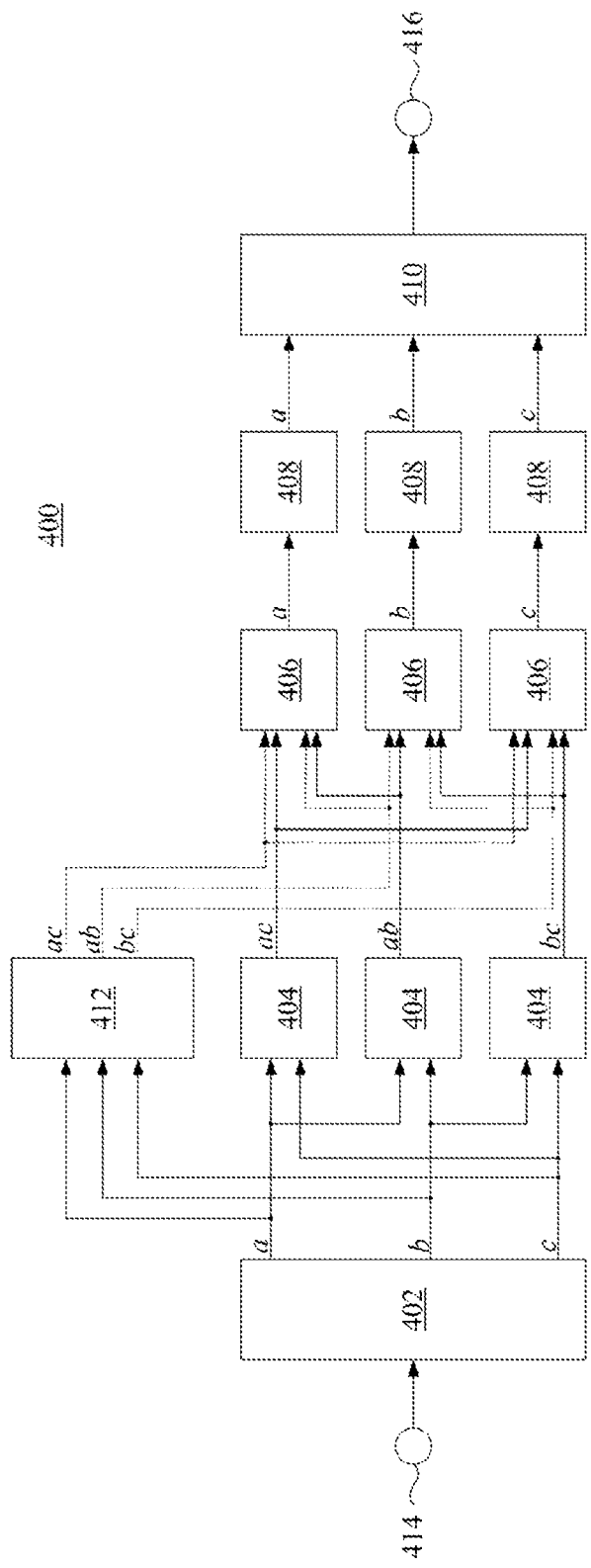
FIG. 4 is a structural block diagram of a neural network for multimodal data according to an exemplary embodiment of the present disclosure.

According to some embodiments, as shown in FIG. 4, the neural network 400 may further include a first correlation calculation subnetwork 412 configured to calculate a correlation coefficient between every two of the plurality of modalities. An input subnetwork 402, a plurality of cross-modal feature subnetworks 404, a plurality of cross-modal fusion subnetworks 406, an output subnetwork 410, multimodal data 414, and a processing result 416 in FIG. 4 are similar to the input subnetwork 202, the plurality of cross-modal feature subnetworks 204, the plurality of cross-modal fusion subnetworks 206, the output subnetwork 208, the multimodal data 210, and the processing result 212 in FIG. 2, respectively. Details are not described herein again. In this way, the cross-modal feature can be fused based on a correlation between modalities by introducing a correlation calculation module and calculating a correlation coefficient between every two modalities, so that the fused feature of each modality can more refer to a cross-modal feature between the modality and another modality more highly correlated with the modality, thereby improving the processing accuracy of the neural network for the multimodal data.

According to some embodiments, the correlation coefficient between every two modalities may be, for example, determined according to a priori knowledge, or may be obtained based on respective first features of the two modalities, or may be obtained based on respective first feature components of the two modalities or determined by using another method. This is not limited herein.

According to some embodiments, the first correlation calculation subnetwork 412 is located between the input subnetwork 402 and the plurality of cross-modal fusion subnetworks 406. In an example embodiment, the correlation coefficient between the two modalities is obtained by performing a dot product of respective first feature components of the two modalities. In another embodiment, the correlation coefficient between the two modalities is obtained by multiplying a first feature component of a first modality by a parameter matrix and then multiplying the result by a first feature component of the second modality. Herein, a parameter of the parameter matrix is determined by training the neural network. The parameter matrix can be used to solve the problem of different dimensions of the first features or the first feature components of different modalities and to adjust the correlation coefficient between the different modalities through training, thereby enhancing a cross-modal feature between the modalities with a higher correlation, weakening the cross-modal feature between the modalities with a lower correlation, and implementing deep fusion of the features of the modalities.

According to some embodiments, the first correlation calculation subnetwork 412 may be further configured to: for each of the plurality of modalities, normalize the correlation coefficient of the modality with respect to each of the modalities other than the modality. In this way, potential risks caused by excessively high or low correlation coefficients to a system are avoided by normalizing these correlation coefficients. In an example embodiment, a softmax function is used to process the correlation coefficient.

After the respective first features of the plurality of modalities are obtained, the plurality of cross-modal feature subnetworks 404 can be used to determine a cross-modal feature between every two modalities. According to some embodiments, the cross-modal feature subnetwork 404 may be configured to perform max-pooling, average pooling, random sampling, median value calculation, weighted summation, and other operations on the respective first features of the two corresponding modalities to obtain the cross-modal feature, or may be configured to use a small neural network to process a feature obtained by splicing the respective first features of the two modalities, to obtain the cross-modal feature, or may be configured to use another method to determine the cross-modal feature. This is not limited herein.

After the cross-modal feature between every two modalities is obtained, the plurality of cross-modal fusion subnetworks 406 can be used to determine a second feature obtained after fusion is performed for each modality and another modality.

According to some embodiments, the cross-modal fusion subnetwork 406 may be configured to perform max-pooling, average pooling, random sampling, median value calculation, weighted summation, and other operations on at least one cross-modal feature corresponding to the target modality to obtain the second feature of the target modality, or may be configured to use a small neural network to process a feature obtained by splicing the at least one cross-modal feature, to obtain the second feature, or may be configured to use another method to determine the second feature. This is not limited herein. It can be understood that the cross-modal feature may simultaneously correspond to two modalities, that is, simultaneously include respective information of the two modalities. The cross-modal feature corresponding to the target modality corresponds to the target modality and may also correspond to a modality other than the target modality.

According to some embodiments, the cross-modal fusion subnetwork 406 is further configured to fuse the at least one cross-modal feature based on a correlation coefficient between respective two modalities corresponding to the at least one cross-modal feature, to output the second feature of the target modality. Dashed lines in FIG. 4 represent correlation coefficients. In an example embodiment, weighted summation can be performed on the at least one cross-modal feature by using these correlation coefficients as weights to obtain the second feature. In this way, the cross-modal feature can be fused based on a correlation coefficient between modalities, so that the fused feature of a specific modality can more refer to a cross-modal feature between the modality and another modality more highly correlated with the modality.

After the respective second features of the plurality of modalities are obtained, a self-attention mechanism can be used for the second features to further reinforce the features. According to some embodiments, as shown in FIG. 4, a plurality of local attention subnetworks 408 in a one-to-one correspondence with a plurality of modalities further exist between the plurality of cross-modal fusion subnetworks 406 and the output subnetwork 410. The local attention subnetwork 408 may be configured to use a self-attention mechanism for a second feature to output a reinforced second feature. In an example embodiment, the local attention subnetwork can be designed based on a structure of an encoder of a Transformer network model to include a multi-head attention subnetwork and a feedforward subnetwork (not shown in the figure) that are sequentially connected. It can be understood that those skilled in the art may select an appropriate network model as the local attention subnetwork by themselves, or may design the local attention subnetwork by themselves according to needs. This is not limited herein.

According to some embodiments, the output subnetwork 410 may be configured to output a processing result of the multimodal data based on respective second features of the plurality of modalities. Specifically, the output subnetwork 410 may determine a final feature of the multimodal data based on the respective second features of the plurality of modalities, and then process the final feature according to corresponding task requirements to obtain the corresponding processing result 416.

According to some embodiments, the output subnetwork 410 may be configured to directly splice the respective second features of the plurality of modalities to obtain the corresponding final feature, or may be configured to perform max-pooling, average pooling, random sampling, median value calculation, weighted summation, and other operations on these second features to obtain the corresponding final feature, or may use another method to process these second features to obtain the corresponding final feature. This is not limited herein. In an example embodiment, the reinforced second feature $\tilde{H}_{agg}^{v}$ of the image modality, a reinforced second feature $\tilde{H}_{agg}^{t}$ of the text modality, and a reinforced second feature $\tilde{H}_{agg}^{a}$ of the audio modality can be spliced to obtain the corresponding final feature: $H_{f}=[\tilde{H}_{agg}^{v}; \tilde{H}_{agg}^{t}; \tilde{H}_{agg}^{a}]$.

According to some embodiments, for a video classification task, the output subnetwork 410 may include an existing neural network (not shown in the figure) for performing a classification task, to process the final feature of video data. In an example embodiment, the output subnetwork 410 may include, for example, a fully connected layer for processing the final feature, to obtain a prediction value corresponding to each class, such that a video classification result can be determined.

In conclusion, cross-modal features and correlation coefficients between different modalities are calculated, for each modality, a global feature of the modality is obtained based on all cross-modal features and corresponding correlation coefficients corresponding to the modality, and then multimodal data is analyzed based on the global feature of the modality, so that the modality features are deeply fused, and interaction between the modality features is enhanced, improving reliability and accuracy of a processing result of the multimodal data. On this basis, orientation of a relationship between the modalities can be introduced to further deepen the fusion and interaction between the modality features and to help the neural network deeply understand the multimodal data.

Figure 5:
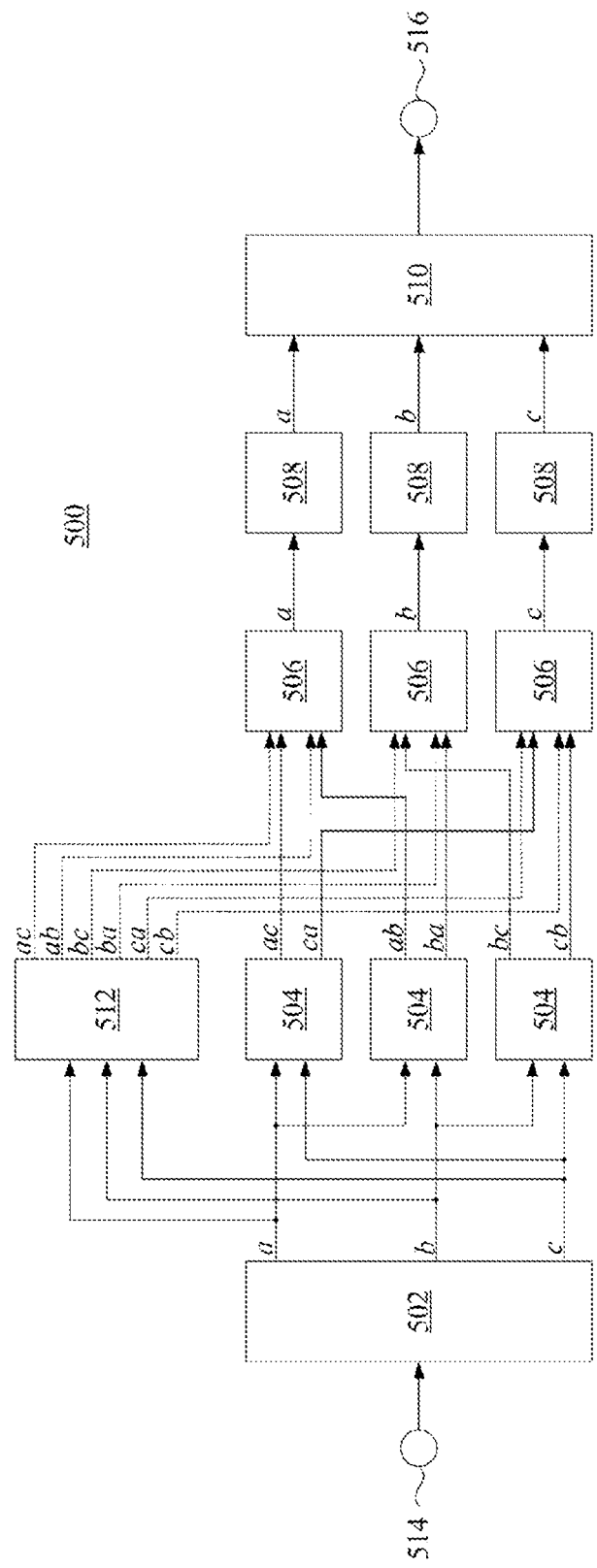
FIG. 5 is a structural block diagram of a neural network for multimodal data according to an exemplary embodiment of the present disclosure.

According to some embodiments, as shown in FIG. 5, the neural network 500 may further include: a second correlation calculation subnetwork 512 configured to determine a correlation coefficient of each of the plurality of modalities with respect to each of the modalities other than the modality. The correlation coefficient is determined at least based on respective first features of the two corresponding modalities. An input subnetwork 502, a local attention subnetwork 508, an output subnetwork 510, multimodal data 514, and a processing result 516 in FIG. 5 are similar to the input subnetwork 402, the local attention subnetwork 408, the output subnetwork 410, the multimodal data 414, and the processing result 416 in FIG. 4, respectively. Details are not described herein again. In this way, the correlation coefficient with orientation between the two modalities is introduced and calculated, such that the cross-modal feature with orientation can be fused based on the correlation with orientation between the modalities, thereby further deepening fusion and interaction between the modality features and improving processing accuracy of the neural network for the multimodal data.

According to some embodiments, the correlation coefficient between every two modalities may be, for example, determined according to a priori knowledge, or may be obtained based on respective first features of the two modalities, or may be obtained based on respective first feature components of the two modalities or determined by using another method. This is not limited herein.

According to some embodiments, the second correlation calculation subnetwork 512 is located between the input subnetwork 502 and the plurality of cross-modal fusion subnetworks 506. In an example embodiment, the correlation coefficient of the first modality with respect to the second modality is obtained by performing a dot product of the first feature component of the first modality and the first feature component of the second modality. In another embodiment, the correlation coefficient between the two modalities is obtained by multiplying a first feature component of a first modality by a parameter matrix and then multiplying the result by a first feature component of the second modality. Herein, a parameter of the parameter matrix is determined by training the neural network. The parameter matrix can be used to solve the problem of different dimensions of the first features or the first feature components of different modalities and to adjust the correlation coefficient between the different modalities through training, thereby enhancing a cross-modal feature between the modalities with a higher correlation, weakening the cross-modal feature between the modalities with a lower correlation, and implementing deep fusion of the features of the modalities. In an example embodiment, the correlation coefficient of the image modality with respect to the text modality may be, for example, represented as:

$$\text{Score}(H_v, H_t) = F_{agg}^{v} W F_{agg}^{t}$$

Herein, $F_{agg}^{v}$ is the first feature component of the image modality, W is the parameter matrix, and $F_{agg}^{t}$ is a first feature component of the text modality.

According to some embodiments, the second correlation calculation subnetwork 512 may be further configured to: for each of the plurality of modalities, normalize the correlation coefficient of the modality with respect to each of the modalities other than the modality. In this way, potential risks caused by excessively high or low correlation coefficients to a system are avoided by normalizing these correlation coefficients. In an example embodiment, a softmax function is used to process the correlation coefficient, and the correlation coefficient of the image modality with respect to the text modality is processed as:

$$R_{vt} = \frac{\exp(\text{Score}(H_v, H_t))}{\exp(\text{Score}(H_v, H_t)) + \exp(\text{Score}(H_v, H_a))}$$

Herein, exp (•) represents an exponential function. Score $(H_v, H_t)$ represents the correlation coefficient of the image modality with respect to the text modality, and Score$(H_v, H_a)$ represents a correlation coefficient of the image modality with respect to the audio modality.

According to some embodiments, the cross-modal feature subnetwork 504 is further configured to: for a first modality and a second modality corresponding to the cross-modal feature subnetwork 504, output a first cross-modal feature of the first modality with respect to the second modality and a second cross-modal feature of the second modality with respect to the first modality. In this way, orientation of the cross-modal feature is introduced to further refine a fusion and interaction relationship between the modalities, further helping the model deeply understand the multimodal data and improving reliability and accuracy of the processing result of the model.

According to some embodiments, the cross-modal feature subnetwork 504 is further configured to: receive a query feature, key feature, and value feature of the first modality and a query feature, key feature, and value feature of the second modality; determine the first cross-modal feature based on the query feature of the first modality, the key feature of the second modality, and the value feature of the second modality; and determine the second cross-modal feature based on the query feature of the second modality, the key feature of the first modality, and the value feature of the first modality. In this way, the foregoing method can be used to further refine a fusion and interaction relationship between the modalities and improve a fusion degree between the modalities, further helping the model deeply understand the multimodal data and improving reliability and accuracy of the processing result of the model.

Figure 6:
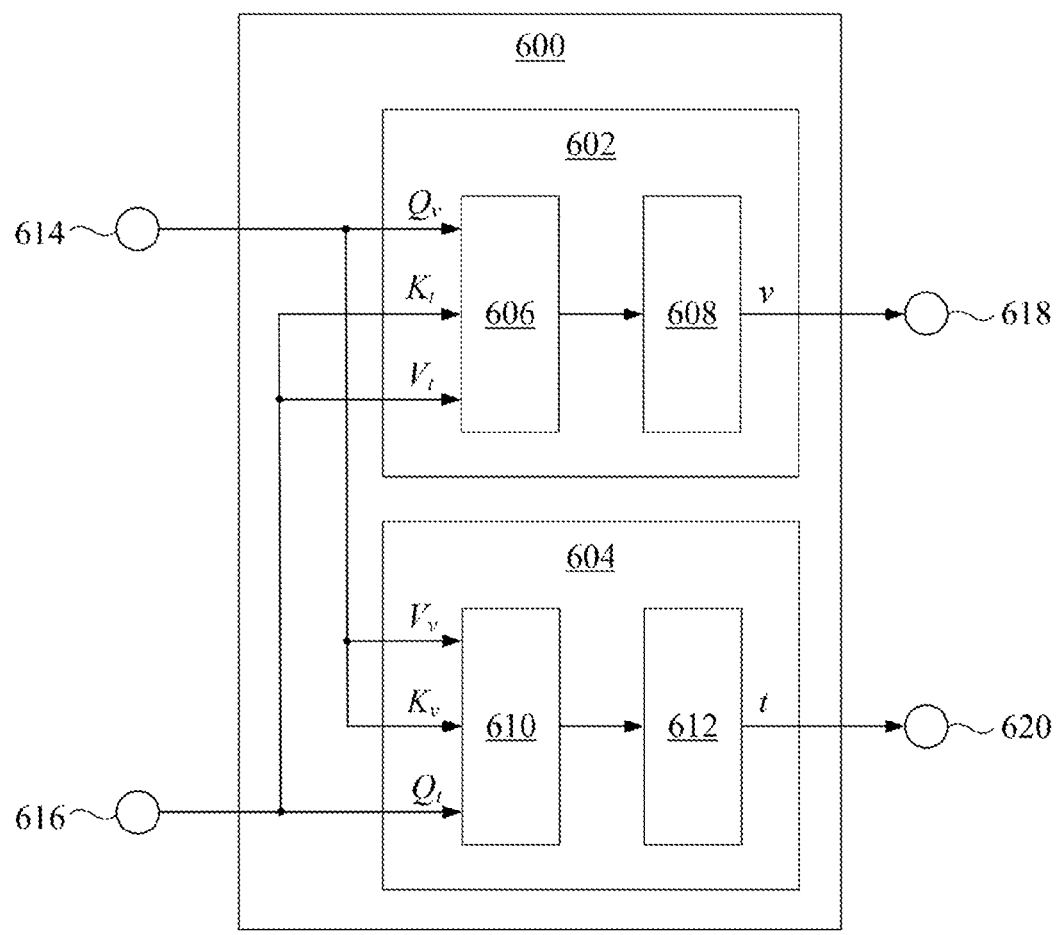
FIG. 6 is a structural block diagram of a cross-modal feature subnetwork according to an exemplary embodiment of the present disclosure.

According to some embodiments, the cross-modal feature subnetwork may be designed similar to the structure of the encoder of the Transformer model. In an example embodiment, as shown in FIG. 6, a first feature 614 of an image modality is mapped to a query feature $Q_v$, a key feature $K_v$, and a value feature $V_v$, and a first feature 616 of a text modality is mapped to a query feature $Q_t$, a key feature $K_t$, and a value feature $V_t$. A cross-modal feature subnetwork 600 includes a first subnetwork 602 corresponding to the image modality and a second subnetwork 604 corresponding to the text modality. The first subnetwork 602 includes a first multi-head attention subnetwork 606 and a first feedforward subnetwork 608 that are sequentially connected. The second subnetwork 604 includes a second multi-head attention subnetwork 610 and a second feedforward subnetwork 612 that are sequentially connected. The first multi-head attention subnetwork 606 receives $Q_v$, $K_t$, and $V_t$, and inputs the output features to the first feedforward subnetwork 608, and then the first feedforward subnetwork 608 outputs a cross-modal feature 618 of the image modality with respect to the text modality. Likewise, the second multi-head attention subnetwork 610 receives $Q_t$, $K_v$, and $V_v$, and inputs the output features to the second feedforward subnetwork 612, and then the second feedforward subnetwork 612 outputs a cross-modal feature 620 of the text modality with respect to the image modality. Processing of the input features by the multi-head attention subnetwork may be represented as:

$$\text{Attention}(Q, K, V) = \text{softmax}\left(\frac{QK^T}{\sqrt{d}}\right)V$$

Herein, Q, K, and V may represent the corresponding query feature, key feature, and value feature respectively, or may respectively represent a query matrix, a key matrix, and a value matrix obtained after the query feature, the key feature, and the value feature are further mapped. This is not limited herein. Herein, d represents a length of the query feature, key feature, and value feature. It should be noted that the query feature, the key feature, and the value feature usually have the same length. If lengths of the three features are different, the three features may be mapped to features with the same length, or mapped to a matrix that have the same length in a specific dimension.

After the cross-modal feature between every two modalities is obtained, the plurality of cross-modal fusion subnetworks 506 can be used to fuse the cross-modal features of each modality with respect to another modality to obtain a second feature of the corresponding modality. According to some embodiments, each of the cross-modal fusion subnetworks 506 is further configured to receive at least one cross-modal feature of the target modality with respect to at least one of the other modalities, to output the second feature of the target modality. In some embodiments, the cross-modal fusion subnetwork may be configured to perform max-pooling, average pooling, random sampling, median value calculation, weighted summation, and other operations on at least one cross-modal feature of the corresponding target modality with respect to at least one of the other modalities to obtain the second feature of the target modality, or may be configured to use a small neural network to process a feature obtained by splicing the at least one cross-modal feature, to obtain the second feature, or may be configured to use another method to determine the second feature. This is not limited herein.

According to some embodiments, the cross-modal fusion subnetwork 506 is further configured to fuse the at least one cross-modal feature of the target modality with respect to at least one of the other modalities based on at least one correlation coefficient of the target modality with respect to at least one of the other modalities, to output the second feature of the target modality. In an example embodiment, weighted summation can be performed on the at least one cross-modal feature by using these correlation coefficients as weights to obtain the second feature. In an example embodiment, processing of an image-text cross-modal feature $\hat{H}_{vt}$, an image-audio cross-modal feature $\hat{H}_{va}$, an image-text correlation coefficient $R_{vt}$, and an image-audio correlation coefficient $R_{va}$ by the cross-modal fusion subnetwork 506 corresponding to the image modality may be represented as:

$$\hat{H}_v = R_{vt}*\hat{H}_{vt} + R_{va}*\hat{H}_{va}$$

Herein, $\hat{H}_v$ is a second feature of the image modality.

In this way, the cross-modal features with orientation are fused based on the correlation coefficient with orientation between the modalities to further refine a fusion and interaction relationship between the modalities, further helping the model deeply understand the multimodal data and improving reliability and accuracy of the processing result of the model.

Figure 7:
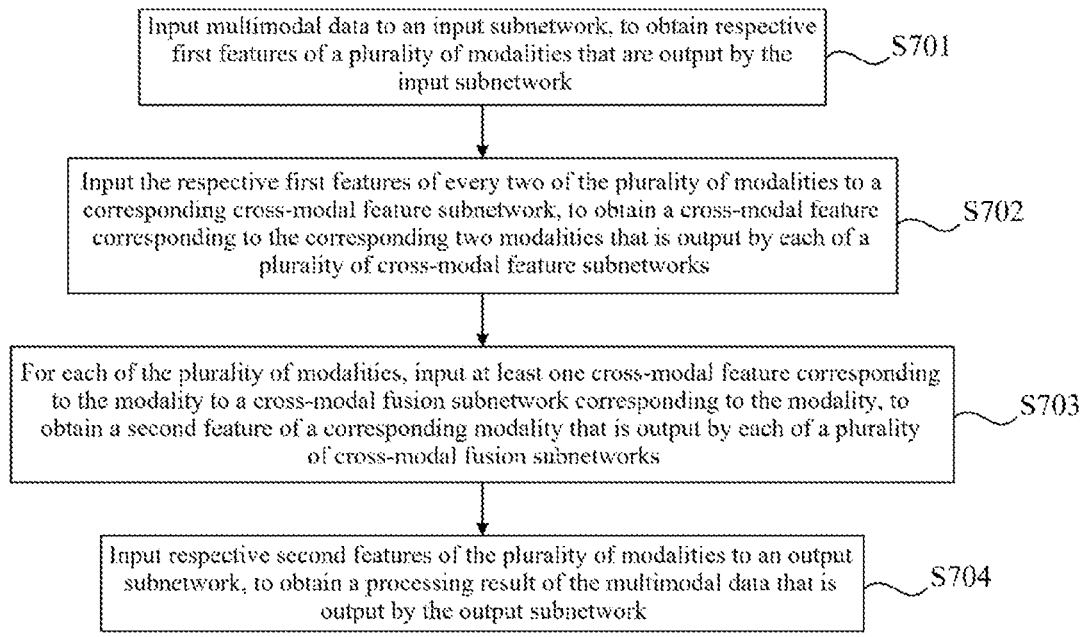
FIG. 7 is a flowchart of a method for processing multimodal data by using a neural network according to an exemplary embodiment of the present disclosure.

According to another aspect of the present disclosure, there is provided a method for processing multimodal data by using a neural network. The neural network includes an input subnetwork, a plurality of parallel cross-modal feature subnetworks, a plurality of parallel cross-modal fusion subnetworks, and an output subnetwork that are sequentially connected, where each of the plurality of cross-modal feature subnetworks corresponds to two modalities in a plurality of modalities included in the multimodal data, and the plurality of cross-modal fusion subnetworks are in a one-to-one correspondence with the plurality of modalities. As shown in FIG. 7, the method includes: step S701: inputting the multimodal data to the input subnetwork, to obtain respective first features of the plurality of modalities that are output by the input subnetwork; step S702: inputting the respective first features of every two of the plurality of modalities to a corresponding cross-modal feature subnetwork, to obtain a cross-modal feature corresponding to the corresponding two modalities that is output by each of the plurality of cross-modal feature subnetworks; step S703: for each of the plurality of modalities, inputting at least one cross-modal feature corresponding to the modality to a cross-modal fusion subnetwork corresponding to the modality, to obtain a second feature of a corresponding modality that is output by each of the plurality of cross-modal fusion subnetworks; and step S704: inputting respective second features of the plurality of modalities to the output subnetwork, to obtain a processing result of the multimodal data that is output by the output subnetwork.

In this way, cross-modal features between different modalities are calculated, for each modality, a global feature of the modality is obtained based on all cross-modal features corresponding to the modality, and then multimodal data is analyzed based on the global feature of the modality, so that the modality features are deeply fused, and interaction between the modality features is enhanced, effectively helping a neural network deeply understand the multimodal data and improving reliability and accuracy of a processing result of the multimodal data.

According to some embodiments, the multimodal data may be a set including data of different modalities, for example, video data of modalities such as image, audio, and text, or commodity data of modalities such as commodity ID, commodity image, and commodity promotional text, or medical data of modalities such as physiological index value, medical image, and case text, or data of other different modalities. This is not limited herein. In an example embodiment, the multimodal data may be video data.

According to some embodiments, the input subnetwork can split raw multimodal data, that is, video data including a text, into corresponding image data, text data, and audio data. In some embodiments, the image data may be, for example, an image sequence including all video frames. The text data may be, for example, a text for describing a video, or may be a caption text in the video, or may be another text related to the video. The audio data may be an audio part in the video. It can be understood that for different types of multimodal data, a corresponding data splitting method can be used to obtain data corresponding to each modality.

According to some embodiments, before data of each modality is input to the input subnetwork, the data of the modality can also be preprocessed, to reduce difficulty of subsequence data processing and improve accuracy of a processing result of the data.

According to some embodiments, the input subnetwork may include: a multimodal splitting subnetwork configured to split multimodal data into respective data of a plurality of modalities; and a plurality of feature extraction subnetworks in a one-to-one correspondence with the plurality of modalities. In some embodiments, step S701 of inputting the multimodal data to the input subnetwork, to obtain respective first features of the plurality of modalities that are output by the input subnetwork may include: inputting respective data of each of the plurality of modalities to a corresponding feature extraction subnetwork, to obtain the first feature of a corresponding modality that is output by each of the plurality of feature extraction subnetworks.

According to some embodiments, each of the plurality of feature extraction subnetworks is configured to: determine an initial feature sequence of a modality in the multimodal data corresponding to the feature extraction subnetwork based on data of the modality, where each item in the initial feature sequence corresponds to one part of the data of the modality; and determine a first feature of the modality at least based on the initial feature sequence. In this way, the feature sequence is extracted from the modality data and then the first feature of the modality is determined based on the feature sequence, so that the feature of the modality can be comprehensively represented. In this way, the feature sequence is extracted from the modality data and then the first feature of the modality is determined based on the feature sequence, so that the feature of the modality can be comprehensively represented.

According to some embodiments, the determining an initial feature sequence of a modality in the multimodal data corresponding to the feature extraction subnetwork based on data of the modality may include, for example: splitting and sampling the data to obtain several parts of data corresponding to data of each modality, and then performing feature extraction on the several parts of data to obtain a corresponding initial feature sequence. In an example embodiment, for image data, key frames are extracted from the image data according to a preset rule, and these key frames are encoded by using an image expert model such as ResNet and Xception to obtain an image feature sequence; for text data, words of each text are encoded by using a text expert model such as ERNIE and BERT to obtain a text feature sequence; and for audio data, the data can be split according to preset duration and converted into frequency-domain signals through Fourier transformation, and then a frequency-domain signal of each segment of audio is encoded by using an audio expert model such as VGGish to obtain an audio feature sequence.

According to some embodiments, lengths of feature sequences output by expert models of different modalities may be the same or different, and feature dimensions of feature sequences output by expert models of different modalities may be the same or different. This is not limited herein. In an example embodiment, feature dimensions of feature sequences output by expert models of different modalities are the same.

According to some embodiments, each modality may correspond to one first feature as a representation of data of the modality. In some example embodiments, a first feature of the image modality may be, for example, obtained after the image sequence is input to a neural network for extracting an image feature, or may be obtained by using a conventional method for extracting an image feature, or may be obtained by using another method. It can be understood that for first features of different modalities, those skilled in the art may select a suitable feature extraction method by themselves according to needs to obtain corresponding first features. This is not limited herein. According to some embodiments, dimensions of first features of different modalities may be the same or different. This is not limited herein. In an example embodiment, dimensions of first features of different modalities are the same.

According to some embodiments, the determining a first feature of the modality at least based on the initial feature sequence may include: determining a first feature component based on the initial feature sequence; determining a second feature component, where the second feature component is capable of indicating a type of the modality; and determining the first feature of the modality based on the first feature component and the second feature component. In this way, first features of different modalities can be distinguished in a feature space by using a feature component for indicating a type of a modality, thereby improving processing accuracy of the neural network for the multimodal data.

According to some embodiments, the first feature component may be determined by performing max-pooling on the initial feature sequence. In this way, through max-pooling on the initial feature sequence, the initial feature sequence is comprehensively represented by the obtained first feature component, thereby improving processing accuracy of the neural network for the multimodal data. It can be understood that those skilled in the art may alternatively obtain the first feature component based on the initial feature sequence using other methods such as average pooling, random sampling, median value calculation, weighted summation, and other operations. This is not limited herein.

According to some embodiments, the determining a first feature of the modality at least based on the initial feature sequence may further include: determining a third feature component, where the third feature component is capable of indicating position information in the initial feature sequence. In an example embodiment, the third feature component can be obtained through position coding.

According to some embodiments, the first feature of the modality may be determined by adding the first feature component, the second feature component, and the third feature component.

According to some embodiments, after the first feature of each modality is obtained, the first feature may be mapped to a query feature Q, a key feature K, and a value feature V for outputting. In some embodiments, for different modalities, a group of different parameter matrices WQ, WK, and WV may be used to map the first feature. In this way, a deeply-fused cross-modal feature can be subsequently generated by mapping the first feature to the three features Q, K, and V.

According to some embodiments, the neural network further includes: a first correlation calculation subnetwork. The method may further include: obtaining a correlation coefficient between every two of the plurality of modalities that is output by the first correlation calculation subnetwork. In this way, the cross-modal feature can be fused based on a correlation between modalities by introducing a correlation calculation module and calculating a correlation coefficient between every two modalities, so that the fused feature of each modality can more refer to a cross-modal feature between the modality and another modality more highly correlated with the modality, thereby improving the processing accuracy of the neural network for the multi-modal data.

According to some embodiments, the correlation coefficient between every two modalities may be, for example, determined according to a priori knowledge, or may be obtained based on respective first features of the two modalities, or may be obtained based on respective first feature components of the two modalities or determined using another method. This is not limited herein.

According to some embodiments, the first correlation calculation subnetwork is located between the input subnetwork and the plurality of cross-modal fusion subnetworks. In an example embodiment, the correlation coefficient between the two modalities is obtained by performing a dot product of respective first feature components of the two modalities. In another embodiment, the correlation coefficient between the two modalities is obtained by multiplying a first feature component of a first modality by a parameter matrix and then multiplying the result by a first feature component of the second modality. Herein, a parameter of the parameter matrix is determined by training the neural network. The parameter matrix can be used to solve the problem of different dimensions of the first features or the first feature components of different modalities and to adjust the correlation coefficient between the different modalities through training, thereby enhancing a cross-modal feature between the modalities with a higher correlation, weakening the cross-modal feature between the modalities with a lower correlation, and implementing deep fusion of the features of the modalities.

According to some embodiments, the first correlation calculation subnetwork may be further configured to: for each of the plurality of modalities, normalize the correlation coefficient of the modality with respect to each of the modalities other than the modality. In this way, potential risks caused by excessively high or low correlation coefficients to a system are avoided by normalizing these correlation coefficients. In an example embodiment, a softmax function is used to process the correlation coefficient.

After the respective first features of the plurality of modalities are obtained, the plurality of cross-modal feature subnetworks can be used to determine a cross-modal feature between every two modalities. According to some embodiments, the cross-modal feature subnetwork may be configured to perform max-pooling, average pooling, random sampling, median value calculation, weighted summation, and other operations on the respective first features of the two corresponding modalities to obtain the cross-modal feature, or may be configured to use a small neural network to process a feature obtained by splicing the respective first features of the two modalities, to obtain the cross-modal feature, or may be configured to use another method to determine the cross-modal feature. This is not limited herein.

After the cross-modal feature between every two modalities is obtained, the plurality of cross-modal fusion subnetworks can be used to determine a second feature obtained after fusion is performed for each modality and another modality.

According to some embodiments, the cross-modal fusion subnetwork may be configured to perform max-pooling, average pooling, random sampling, median value calculation, weighted summation, and other operations on at least one cross-modal feature corresponding to the target modality to obtain the second feature of the target modality, or may be configured to use a small neural network to process a feature obtained by splicing the at least one cross-modal feature, to obtain the second feature, or may be configured to use another method to determine the second feature. This is not limited herein. It can be understood that the cross-modal feature may simultaneously correspond to two modalities, that is, simultaneously include respective information of the two modalities. The cross-modal feature corresponding to the target modality corresponds to the target modality and may also correspond to a modality other than the target modality.

According to some embodiments, the cross-modal fusion subnetwork is further configured to fuse the at least one cross-modal feature based on a correlation coefficient between respective two modalities corresponding to the at least one cross-modal feature, to output the second feature of the target modality. In an example embodiment, weighted summation can be performed on the at least one cross-modal feature using these correlation coefficients as weights to obtain the second feature. In this way, the cross-modal feature can be fused based on a correlation coefficient between modalities, so that the fused feature of a specific modality can more refer to a cross-modal feature between the modality and another modality more highly correlated with the modality.

After the respective second features of the plurality of modalities are obtained, a self-attention mechanism can be used for the second features to further reinforce the features. According to some embodiments, a plurality of local attention subnetworks in a one-to-one correspondence with a plurality of modalities further exist between the plurality of cross-modal fusion subnetworks and the output subnetwork. The local attention subnetwork may be configured to use a self-attention mechanism for a second feature to output a reinforced second feature. In an example embodiment, the local attention subnetwork can be designed based on a structure of an encoder of a Transformer network model to include a multi-head attention subnetwork and a feedforward subnetwork that are sequentially connected. It can be understood that those skilled in the art may select an appropriate network model as the local attention subnetwork by themselves, or may design the local attention subnetwork by themselves according to needs. This is not limited herein.

According to some embodiments, the output subnetwork may be configured to output a processing result of the multimodal data based on respective second features of the plurality of modalities. Specifically, the output subnetwork may determine a final feature of the multimodal data based on the respective second features of the plurality of modalities, and then process the final feature according to corresponding task requirements to obtain the corresponding processing result.

According to some embodiments, the output subnetwork may be configured to directly splice the respective second features of the plurality of modalities to obtain the corresponding final feature, or may be configured to perform max-pooling, average pooling, random sampling, median value calculation, weighted summation, and other operations on these second features to obtain the corresponding final feature, or may use another method to process these second features to obtain the corresponding final feature. This is not limited herein.

According to some embodiments, for a video classification task, the output subnetwork may include an existing neural network for performing a classification task, to process the final feature of video data. In an example embodiment, the output subnetwork may include, for example, a fully connected layer for processing the final feature, to obtain a prediction value corresponding to each class, such that a video classification result can be determined.

In conclusion, cross-modal features and correlation coefficients between different modalities are calculated, for each modality, a global feature of the modality is obtained based on all cross-modal features and corresponding correlation coefficients corresponding to the modality, and then multimodal data is analyzed based on the global feature of the modality, so that the modality features are deeply fused, and interaction between the modality features is enhanced, improving reliability and accuracy of a processing result of the multimodal data. On this basis, orientation of a relationship between the modalities can be introduced to further deepen the fusion and interaction between the modality features and to help the neural network deeply understand the multimodal data.

Figure 8:
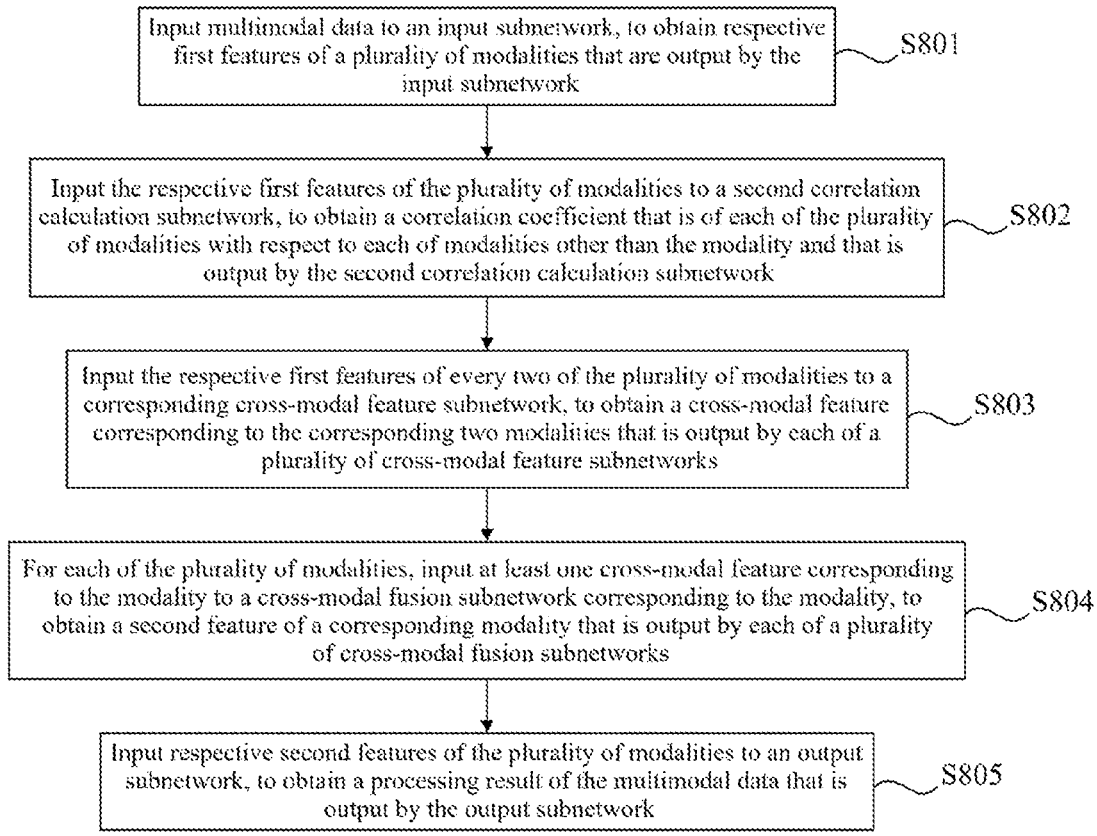
FIG. 8 is a flowchart of a method for processing multimodal data by using a neural network according to an exemplary embodiment of the present disclosure.

According to some embodiments, the neural network further includes: a second correlation calculation subnetwork configured to determine a correlation coefficient of each of the plurality of modalities with respect to each of the modalities other than the modality. As shown in FIG. 8, the method further includes: step S802: inputting the respective first features of the plurality of modalities to the second correlation calculation subnetwork, to obtain a correlation coefficient that is of each of the plurality of modalities with respect to each of the modalities other than the modality and that is output by the second correlation calculation subnetwork. The correlation coefficient is determined at least based on respective first features of the two corresponding modalities. Operations of step S801 and steps S803 to S805 in FIG. 8 are respectively similar to operations of steps S701 to S704 in FIG. 7. Details are not described herein again. In this way, the correlation coefficient with orientation between the two modalities is introduced and calculated, such that the cross-modal feature with orientation can be fused based on the correlation with orientation between the modalities, thereby further deepening fusion and interaction between the modality features and improving processing accuracy of the neural network for the multimodal data.

According to some embodiments, the correlation coefficient between every two modalities may be, for example, determined according to a priori knowledge, or may be obtained based on respective first features of the two modalities, or may be obtained based on respective first feature components of the two modalities or determined using another method. This is not limited herein.

According to some embodiments, the second correlation calculation subnetwork is located between the input subnetwork and the plurality of cross-modal fusion subnetworks. In an example embodiment, the correlation coefficient of the first modality with respect to the second modality is obtained by performing a dot product of the first feature component of the first modality and the first feature component of the second modality. In another embodiment, the correlation coefficient between the two modalities is obtained by multiplying a first feature component of a first modality by a parameter matrix and then multiplying the result by a first feature component of the second modality. Herein, a parameter of the parameter matrix is determined by training the neural network. The parameter matrix can be used to solve the problem of different dimensions of the first features or the first feature components of different modalities and to adjust the correlation coefficient between the different modalities through training, thereby enhancing a cross-modal feature between the modalities with a higher correlation, weakening the cross-modal feature between the modalities with a lower correlation, and implementing deep fusion of the features of the modalities.

According to some embodiments, the second correlation calculation subnetwork may be further configured to: for each of the plurality of modalities, normalize the correlation coefficient of the modality with respect to each of the modalities other than the modality. In this way, potential risks caused by excessively high or low correlation coefficients to a system are avoided by normalizing these correlation coefficients. In an example embodiment, a softmax function is used to process the correlation coefficient.

According to some embodiments, each of the cross-modal feature subnetworks is further configured to: for a first modality and a second modality corresponding to the cross-modal feature subnetwork, output a first cross-modal feature of the first modality with respect to the second modality and a second cross-modal feature of the second modality with respect to the first modality. In this way, orientation of the cross-modal feature is introduced to further refine a fusion and interaction relationship between the modalities, further helping the model deeply understand the multimodal data and improving reliability and accuracy of the processing result of the model.

According to some embodiments, the cross-modal feature subnetwork is further configured to: receive a query feature, key feature, and value feature of the first modality and a query feature, key feature, and value feature of the second modality; determine the first cross-modal feature based on the query feature of the first modality, the key feature of the second modality, and the value feature of the second modality; and determine the second cross-modal feature based on the query feature of the second modality, the key feature of the first modality, and the value feature of the first modality. In this way, the foregoing method can be used to further refine a fusion and interaction relationship between the modalities and improve a fusion degree between the modalities, further helping the model deeply understand the multimodal data and improving reliability and accuracy of the processing result of the model.

According to some embodiments, the cross-modal feature subnetwork may be designed similar to the structure of the encoder of the Transformer model.

According to some embodiments, each of the cross-modal fusion subnetworks is further configured to receive at least one cross-modal feature of the target modality with respect to at least one of the other modalities, to output the second feature of the target modality. In some embodiments, the cross-modal fusion subnetwork may be configured to perform max-pooling, average pooling, random sampling, median value calculation, weighted summation, and other operations on at least one cross-modal feature of the corresponding target modality with respect to at least one of the other modalities to obtain the second feature of the target modality, or may be configured to use a small neural network to process a feature obtained by splicing the at least one cross-modal feature, to obtain the second feature, or may be configured to use another method to determine the second feature. This is not limited herein.

After the cross-modal feature between every two modalities is obtained, the plurality of cross-modal fusion subnetworks can be used to fuse the cross-modal features of each modality with respect to another modality to obtain a second feature of the corresponding modality. According to some embodiments, each of the cross-modal fusion subnetworks is further configured to receive at least one cross-modal feature of the target modality with respect to at least one of the other modalities, to output the second feature of the target modality. In some embodiments, the cross-modal fusion subnetwork may be configured to perform max-pooling, average pooling, random sampling, median value calculation, weighted summation, and other operations on at least one cross-modal feature of the corresponding target modality with respect to at least one of the other modalities to obtain the second feature of the target modality, or may be configured to use a small neural network to process a feature obtained by splicing the at least one cross-modal feature, to obtain the second feature, or may be configured to use another method to determine the second feature. This is not limited herein.

According to some embodiments, the cross-modal fusion subnetwork is further configured to fuse the at least one cross-modal feature of the target modality with respect to at least one of the other modalities based on at least one correlation coefficient of the target modality with respect to at least one of the other modalities, to output the second feature of the target modality. In an example embodiment, weighted summation can be performed on the at least one cross-modal feature using these correlation coefficients as weights to obtain the second feature. In this way, the cross-modal features with orientation are fused based on the correlation coefficient with orientation between the modalities to further refine a fusion and interaction relationship between the modalities, further helping the model deeply understand the multimodal data and improving reliability and accuracy of the processing result of the model.

Figure 9:
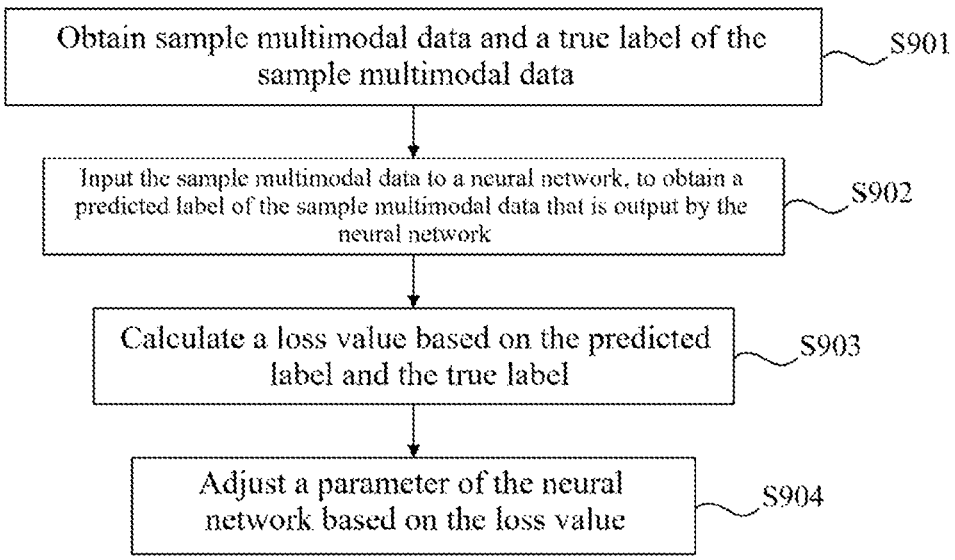
FIG. 9 is a flowchart of a training method for a neural network according to an exemplary embodiment of the present disclosure.

According to another aspect of the present disclosure, there is provided a training method for a neural network. As shown in FIG. 9, the training method includes: step S901: obtaining sample multimodal data and a true label of the sample multimodal data; step S902: inputting the sample multimodal data to the neural network described above, to obtain a predicted label of the sample multimodal data that is output by the neural network; step S903: calculating a loss value based on the predicted label and the true label; and step S904: adjusting a parameter of the neural network based on the loss value.

In this way, the neural network that can calculate the cross-modal features between the different modalities, can obtain, for each modality, a global feature of the modality based on all the cross-modal features corresponding to the modality, and then can analyze the multimodal data based on the global feature of the modality is trained, such that the modality features are deeply fused, and interaction between the modality features is enhanced, effectively helping the neural network deeply understand the multimodal data and improving reliability and accuracy of the processing result of the multimodal data.

According to some embodiments, the foregoing method can be used to adjust parameters of the plurality of feature extraction subnetworks 306 in the input subnetwork 300, parameters for mapping a first feature to each of Q, K, and V, parameters of a parameter matrix of the first correlation calculation subnetwork 412 or the second correlation calculation subnetwork 512, and parameters of the first multi-head attention subnetwork 606, the first feedforward subnetwork 608, the second multi-head attention subnetwork 610, and the second feedforward subnetwork 612 in the cross-modal feature subnetwork 600, the local attention subnetwork 508, and the output subnetwork 510, to obtain the trained neural network.

In the technical solutions of the present disclosure, collecting, storage, use, processing, transmitting, providing, disclosing, etc. of personal information of a user involved all comply with related laws and regulations and are not against the public order and good morals.

According to the embodiments of the present disclosure, there are further provided an electronic device, a readable storage medium, and a computer program product.

Figure 10:
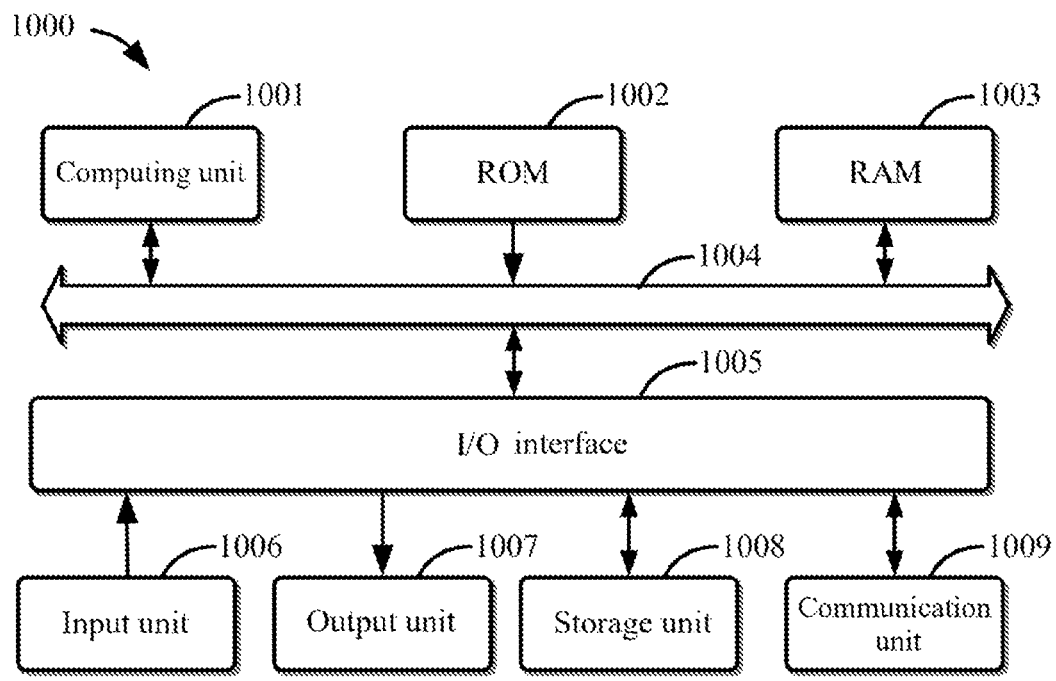
FIG. 10 is a structural block diagram of an exemplary electronic device that can be used to implement an embodiment of the present disclosure.

Referring to FIG. 10, a structural block diagram of an electronic device 1000 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 10, the device 1000 includes a computing unit 1001, which may perform various appropriate actions and processing according to a computer program stored in a read-only memory (ROM) 1002 or a computer program loaded from a storage unit 1008 to a random access memory (RAM) 1003. The RAM 1003 may further store various programs and data required for the operation of the device 1000. The computing unit 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, an output unit 1007, the storage unit 1008, and a communication unit 1009. The input unit 1006 may be any type of device capable of entering information to the device 1000. The input unit 1006 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 1007 may be any type of device capable of presenting information, and may include, but is not limited to, a display, a speaker, a video/audio output terminal, a vibrator, and/or a printer. The storage unit 1008 may include, but is not limited to, a magnetic disk and an optical disc. The communication unit 1009 allows the device 1000 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 802.11 device, a Wi-Fi device, a WiMax device, a cellular communication device, and/or the like.

The computing unit 1001 may be various general-purpose and/or special-purpose processing components with processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1001 performs the various methods and processing described above, for example, the method for processing multimodal data and the training method. For example, in some embodiments, the method for processing multimodal data and the training method may be each implemented as a computer software program, which is tangibly contained in a machine-readable medium, such as the storage unit 1008. In some embodiments, a part or all of the computer program may be loaded and/or installed onto the device 1000 via the ROM 1002 and/or the communication unit 1009. When the computer program is loaded onto the RAM 1003 and executed by the computing unit 1001, one or more steps of the method for processing multimodal data and the training method described above can be performed. Alternatively, in other embodiments, the computing unit 1001 may be configured, by any other suitable means (for example, by means of firmware), to perform the method for processing multimodal data and the training method.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, which is also referred to as a cloud computing server or a cloud host, and is a host product in a cloud computing service system for overcoming defects of difficult management and weak business expansion in conventional physical hosts and virtual private server (VPS) services. The server may alternatively be a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems, and devices described above are merely example embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A neural network for multimodal data, comprising:
an input subnetwork configured to receive multimodal data to output respective first features of a plurality of modalities comprised in the multimodal data;
a plurality of cross-modal feature subnetworks, each cross-modal feature subnetwork of the plurality of cross-modal feature subnetworks corresponds to two modalities of the plurality of modalities and is configured to receive the respective first features of the two modalities to output a cross-modal feature corresponding to the two modalities;
a plurality of cross-modal fusion subnetworks in a one-to-one correspondence with the plurality of modalities, wherein each cross-modal fusion subnetwork of the plurality of cross-modal fusion subnetworks is configured to: for a modality corresponding to the cross-modal fusion subnetwork, receive at least one cross-modal feature corresponding to the modality to output a second feature of the modality;
an output subnetwork configured to receive the respective second features of the plurality of modalities to output a processing result of the multimodal data; and
a first correlation calculation subnetwork configured to calculate a correlation coefficient between every two modalities of the plurality of modalities;
wherein each of the cross-modal fusion subnetworks is further configured to fuse the at least one cross-modal feature based on a correlation coefficient between respective two modalities corresponding to the at least one cross-modal feature, to output the second feature of a target modality.

2. The network according to claim 1, wherein for each cross-modal feature subnetwork of the cross-modal feature subnetworks, the cross-modal feature subnetwork is configured to: for a first modality and a second modality corresponding to the cross-modal feature subnetwork, output a first cross-modal feature of the first modality with respect to the second modality and a second cross-modal feature of the second modality with respect to the first modality; and wherein for each cross-modal fusion subnetwork of the cross-modal fusion subnetworks, the cross-modal fusion subnetwork is configured to receive at least one cross-modal feature of a target modality with respect to at least one of the other modalities, to output the second feature of the target modality.

3. The network according to claim 2, wherein the input subnetwork is further configured to map each of the respective first features of the plurality of modalities to a query feature, a key feature, and a value feature for outputting; and
wherein each cross-modal feature subnetwork of the cross-modal feature subnetworks is further configured to:
receive a query feature, a key feature, and a value feature of the corresponding first modality and a query feature, a key feature, and a value feature of the corresponding second modality;
determine the first cross-modal feature based on the query feature of the corresponding first modality, the key feature of the corresponding second modality, and the value feature of the corresponding second modality; and
determine the second cross-modal feature based on the query feature of the corresponding second modality, the key feature of the corresponding first modality, and the value feature of the corresponding first modality.

4. The network according to claim 2, further comprising:
a second correlation calculation subnetwork configured to determine a correlation coefficient of each modality of the plurality of modalities with respect to each modality of modalities other than the modality, wherein the correlation coefficient is determined at least based on respective first features of the two corresponding modalities, and
wherein each cross-modal fusion subnetwork of the cross-modal fusion subnetworks is further configured to fuse the at least one cross-modal feature of the target modality with respect to at least one of the other modalities based on at least one correlation coefficient of the target modality with respect to at least one of the other modalities, to output the second feature of the target modality.

5. The network according to claim 4, wherein the second correlation calculation subnetwork is further configured to:
normalize, for each modality of the plurality of modalities, the correlation coefficient of the modality with respect to each modality of the modalities other than the modality.

6. The network according to claim 1, wherein the input subnetwork comprises:
a plurality of feature extraction subnetworks in a one-to-one correspondence with the plurality of modalities, wherein each feature extraction subnetwork of the plurality of feature extraction subnetworks is configured to:
determine an initial feature sequence of a modality in the multimodal data corresponding to the feature extraction subnetwork based on data of the modality, wherein each item in the initial feature sequence corresponds to one part of the data of the modality; and
determine the first feature of the modality at least based on the initial feature sequence.

7. The network according to claim 6, wherein the determining the first feature of the modality at least based on the initial feature sequence comprises:

determining a first feature component based on the initial feature sequence;

determining a second feature component, wherein the second feature component indicating a type of the modality; and determining the first feature of the modality based on the first feature component and the second feature component.

8. The network according to claim 7, wherein the first feature component is determined by performing max-pooling on the initial feature sequence.

9. The network according to claim 1, wherein the multimodal data is video data.

10. The network according to claim 9, wherein the plurality of modalities comprises an image modality, a text modality, and an audio modality.

11. A method for processing multimodal data using a neural network, wherein the neural network comprises an input subnetwork, a plurality of parallel cross-modal feature subnetworks, a plurality of parallel cross-modal fusion subnetworks, a first correlation calculation subnetwork, and an output subnetwork, wherein the plurality of parallel cross-modal feature subnetworks, the plurality of parallel cross-modal fusion subnetworks, and the output subnetwork are sequentially connected, wherein each cross-modal feature subnetwork of the plurality of parallel cross-modal feature subnetworks corresponds to two modalities in a plurality of modalities comprised in the multimodal data, and the plurality of parallel cross-modal fusion subnetworks are in a one-to-one correspondence with the plurality of modalities, wherein the first correlation calculation subnetwork is located between the input subnetwork and the plurality of parallel cross-modal fusion subnetworks, and wherein the method comprises:

inputting the multimodal data to the input subnetwork to obtain respective first features of the plurality of modalities that are output by the input subnetwork;

inputting the respective first features of every two modalities of the plurality of modalities to a corresponding cross-modal feature subnetwork of the plurality of parallel cross-modal feature subnetworks, to obtain a cross-modal feature to the corresponding two modalities that is output by each cross-modal feature subnetwork of the plurality of parallel cross-modal feature subnetworks;

for each modality of the plurality of modalities, inputting at least one cross-modal feature corresponding to the modality to a cross-modal fusion subnetwork of the plurality of parallel cross-modal fusion subnetworks corresponding to the modality, to obtain a second feature of a corresponding modality that is output by each cross-modal fusion subnetworks of the plurality of parallel cross-modal fusion subnetworks;

obtaining a correlation coefficient between every two modalities of the plurality of modalities that is output by the first correlation calculation subnetwork, wherein each cross-modal fusion subnetwork of the plurality of parallel cross-modal fusion subnetworks is further configured to fuse the at least one cross-modal feature based on the correlation coefficient between respective two modalities corresponding to the at least one cross-modal feature, to output the second feature of a target modality; and inputting respective second features of the plurality of modalities to the output subnetwork, to obtain a processing result of the multimodal data that is output by the output subnetwork.

12. The method according to claim 11, wherein for each cross-modal feature subnetwork of the plurality of parallel cross-modal feature subnetworks, the cross-modal feature subnetwork is configured to, for a first modality and a second modality corresponding to the cross-modal feature subnetwork, output a first cross-modal feature of the first modality with respect to the second modality and a second cross-modal feature of the second modality with respect to the first modality; and wherein for each cross-modal fusion subnetwork of the plurality of parallel cross-modal fusion subnetworks, the cross-modal fusion subnetwork is configured to receive at least one cross-modal feature of a target modality with respect to at least one of the other modalities, to output the second feature of the target modality.

13. The method according to claim 12, wherein the input subnetwork is further configured to map each of the respective first features of the plurality of modalities to a query feature, a key feature, and a value feature for outputting; and wherein each cross-modal feature subnetwork of the plurality of parallel cross-modal feature subnetworks is further configured to:

receive a query feature, a key feature, and a value feature of the corresponding first modality and a query feature, a key feature, and a value feature of the corresponding second modality;

determine the first cross-modal feature based on the query feature of the corresponding first modality, the key feature of the corresponding second modality, and the value feature of the corresponding second modality; and determine the second cross-modal feature based on the query feature of the corresponding second modality, the key feature of the corresponding first modality, and the value feature of the corresponding first modality.

14. The method according to claim 12, wherein the neural network further comprises a second correlation calculation subnetwork that is located between the input subnetwork and the plurality of parallel cross-modal fusion subnetworks, wherein the method further comprises:

inputting the respective first features of the plurality of modalities to the second correlation calculation subnetwork, to obtain a correlation coefficient that is of each of the plurality of modalities with respect to each of the modalities other than the modality and that is output by the second correlation calculation subnetwork, wherein the correlation coefficient is determined at least based on the respective first features of the two corresponding modalities, wherein each cross-modal fusion subnetwork of the plurality of parallel cross-modal fusion subnetworks is further configured to fuse the at least one cross-modal feature of the target modality with respect to at least one of the other modalities based on at least one correlation coefficient of the target modality with respect to at least one of the other modalities, to output the second feature of the target modality.

15. The method according to claim 14, wherein for each modality of the plurality of modalities, the second correlation calculation subnetwork is configured to normalize the correlation coefficient of the modality with respect to each of the modalities other than the modality.

16. A training method for a neural network, wherein the neural network comprises an input subnetwork, a plurality of parallel cross-modal feature subnetworks, a plurality of parallel cross-modal fusion subnetworks, a first correlation calculation subnetwork, and an output subnetwork, wherein the plurality of parallel cross-modal feature subnetworks, the plurality of parallel cross-modal fusion subnetworks, and the output subnetwork are sequentially connected, wherein each cross-modal feature subnetwork of the plurality of parallel cross-modal feature subnetworks corresponds to two modalities in a plurality of modalities comprised in multimodal data, and the plurality of cross-modal fusion subnetworks are in a one-to-one correspondence with the plurality of modalities, wherein the first correlation calculation subnetwork is located between the input subnetwork and the plurality of parallel cross-modal fusion subnetworks, and wherein the method comprises:

obtaining sample multimodal data and a true label of the sample multimodal data;

inputting the sample multimodal data to the input subnetwork, to obtain respective first features of the plurality of modalities that are output by the input subnetwork;

inputting the respective first features of every two modalities of the plurality of modalities to a corresponding cross-modal feature subnetwork of the plurality of parallel cross-modal feature subnetworks, to obtain a cross-modal feature corresponding to the two modalities that is output by each cross-modal feature subnetwork of the plurality of parallel cross-modal feature subnetworks;

for each modality of the plurality of modalities, inputting at least one cross-modal feature corresponding to the modality to a cross-modal fusion subnetwork of the plurality of parallel cross-modal fusion subnetworks corresponding to the modality, to obtain a second feature of a corresponding modality that is output by each cross-modal fusion subnetworks of the plurality of parallel cross-modal fusion subnetworks;

obtaining a correlation coefficient between every two modalities of the plurality of modalities that is output by the first correlation calculation subnetwork, wherein each cross-modal fusion subnetwork of the plurality of parallel cross-modal fusion subnetworks is further configured to fuse the at least one cross-modal feature based on the correlation coefficient between respective two modalities corresponding to the at least one cross-modal feature, to output the second feature of a target modality;

inputting respective second features of the plurality of modalities to the output subnetwork, to obtain a predicted label of the sample multimodal data that is output by the output subnetwork;

calculating a loss value based on the predicted label and the true label; and adjusting a parameter of the neural network based on the loss value.

17. An electronic device, comprising:
at least one processor; and
a memory storing one or more programs configured to be executed by the one or more processors, the one or more programs including instructions for performing the method according to claim 11.

18. A non-transitory computer-readable storage medium storing one or more programs, the one or more programs comprising instructions that, when executed by one or more processors of an electronic device, cause the electronic device to perform the method according to claim 11.

* * * * *